July 7, 1936.  E. J. HOLLISTER  2,046,950
INKING DEVICE FOR FINGERPRINTS
Filed March 16, 1935  6 Sheets-Sheet 1
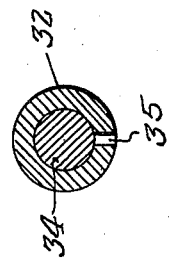
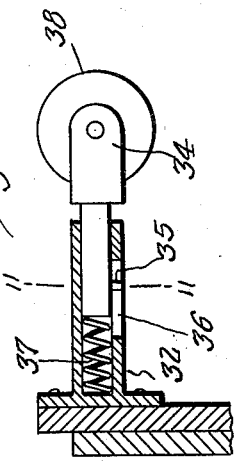
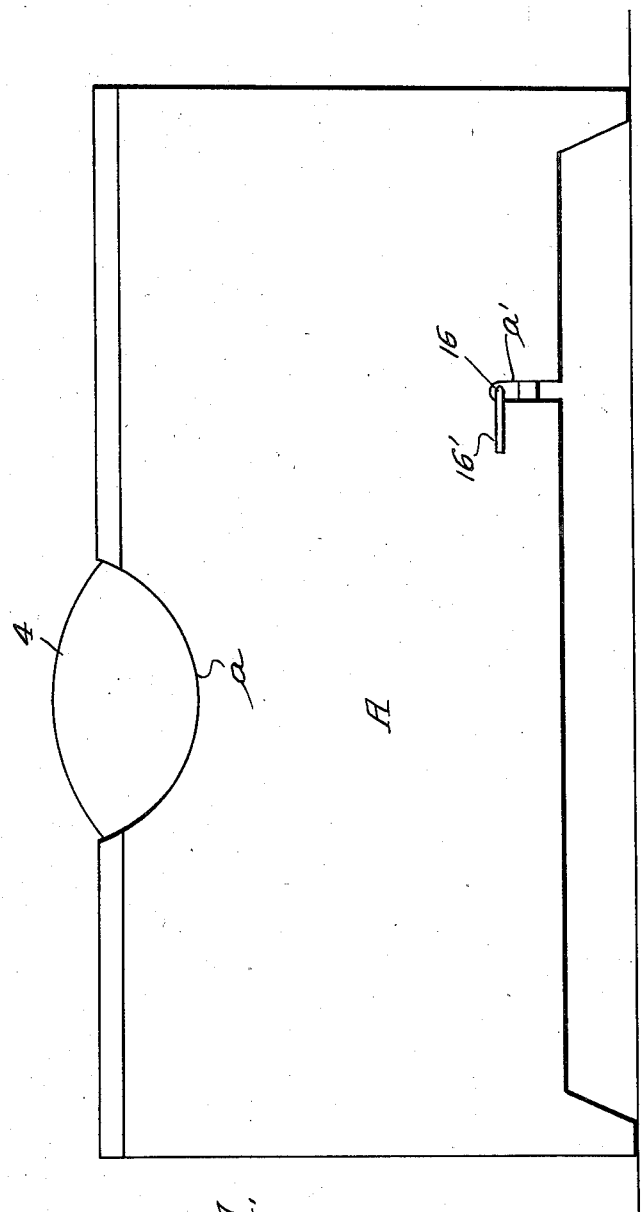
Inventor
*Edward J. Hollister,*
By *Clarence A. O'Brien*
Attorney July 7, 1936.　　　　E. J. HOLLISTER　　　　2,046,950
INKING DEVICE FOR FINGERPRINTS
Filed March 16, 1935　　　6 Sheets-Sheet 2

Inventor
Edward J. Hollister,
By Clarence A. O'Brien
Attorney

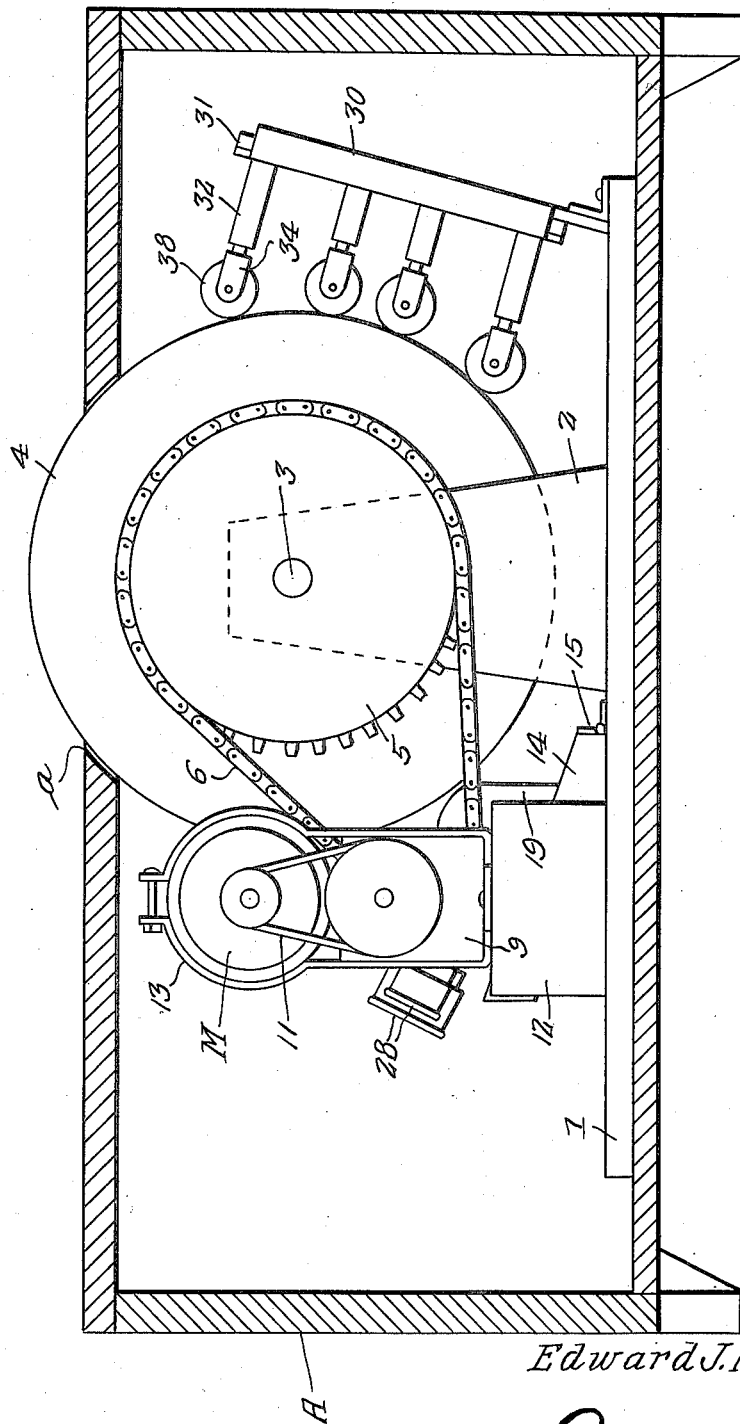

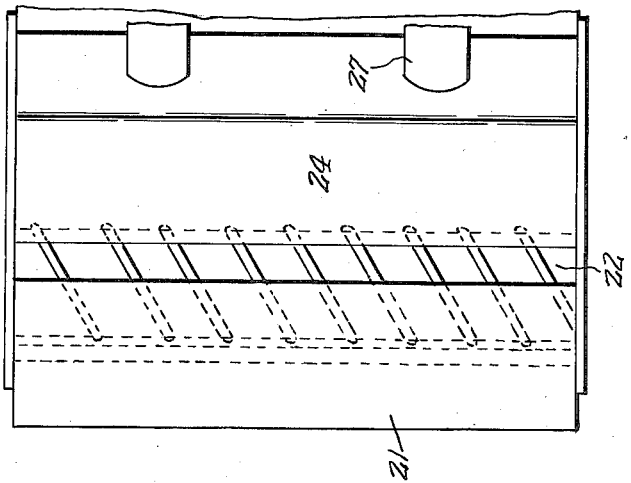
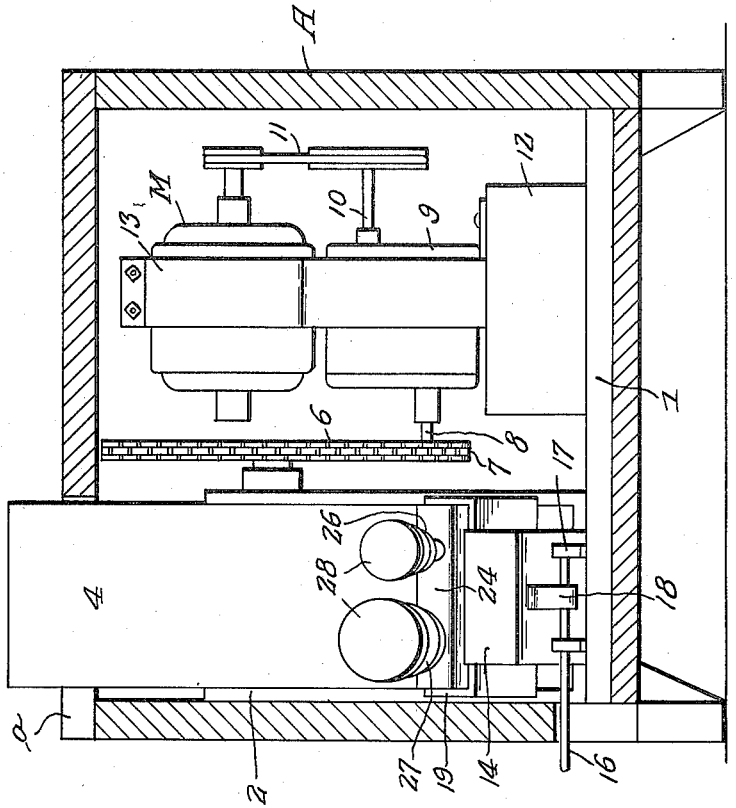

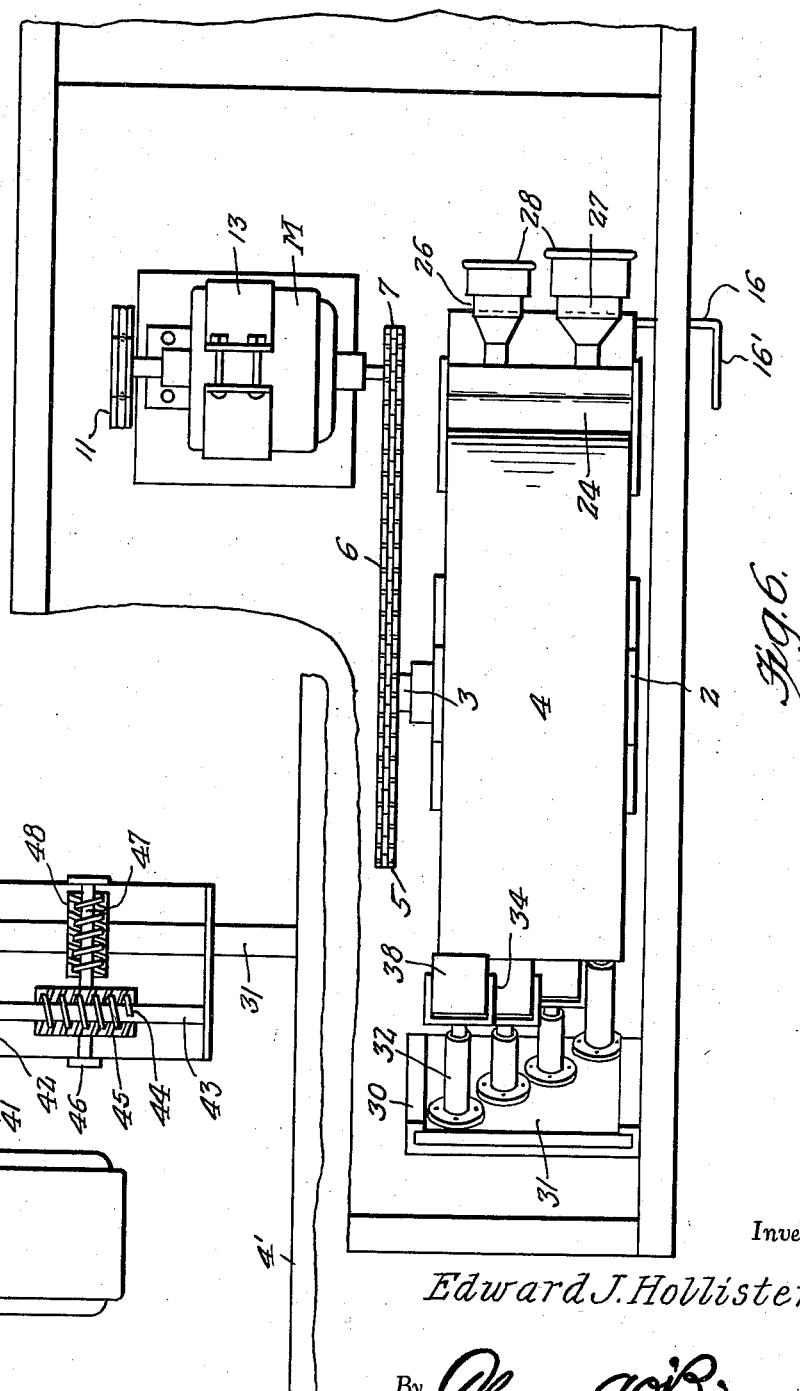

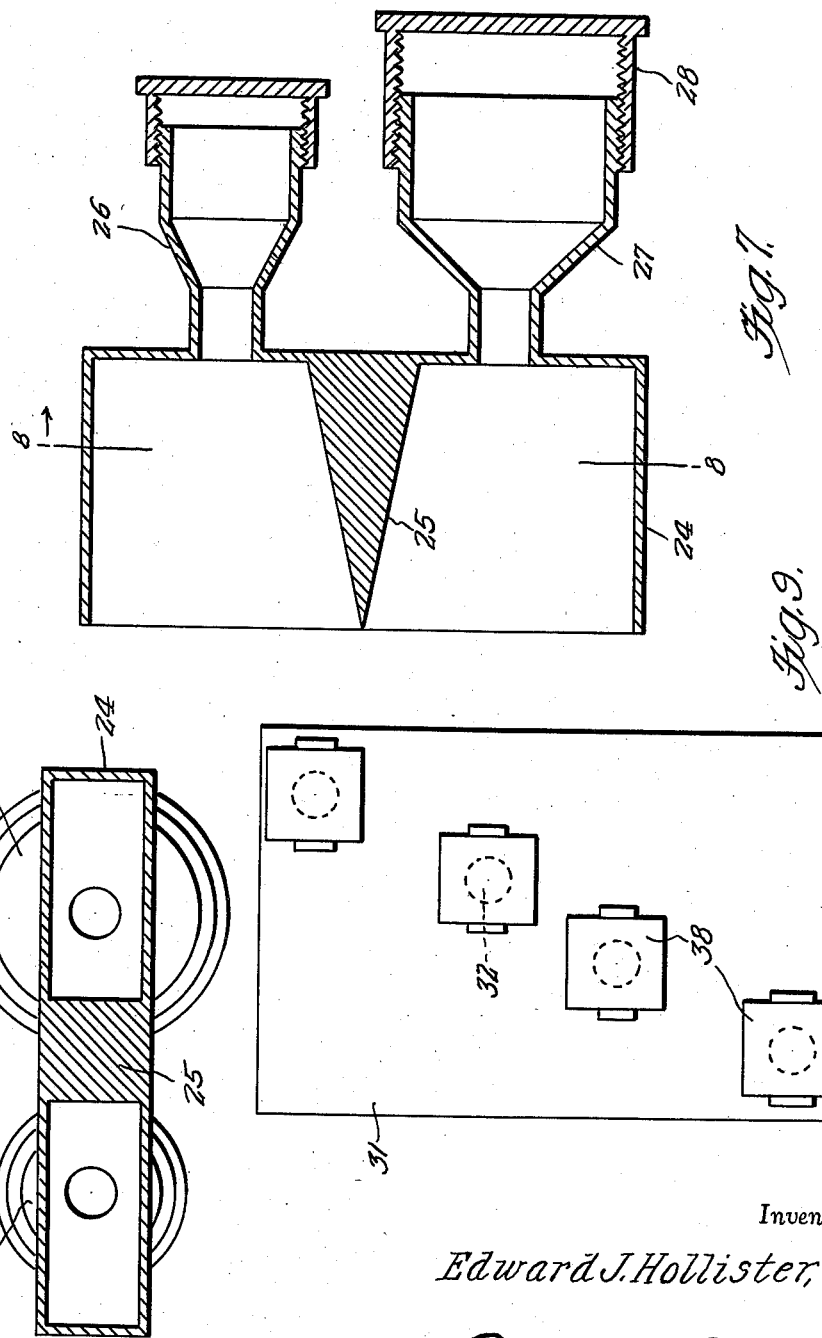

Patented July 7, 1936

2,046,950

UNITED STATES PATENT OFFICE 2,046,950

INKING DEVICE FOR FINGERPRINTS

Edward J. Hollister, Canon City, Colo.

Application March 16, 1935, Serial No. 11,473

4 Claims. (Cl. 91—50)

This invention relates to an inking device for fingerprints, the general object of the invention being to provide a drum provided with means for slowly rotating it and means for supplying and spreading ink on the drum so that fingers can be inked from the drum to take prints therefrom in a minimum amount of time and the least possible effort.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of the device.

Figure 3 is a similar view but looking toward the opposite side of the device.

Figure 4 is a section on the line 4—4 of Figure 2.

Figure 5 is a view of the inking rollers and the parts adjacent thereto.

Figure 6 is a top plan view with parts removed and partly broken away.

Figure 7 is a longitudinal sectional view of the inkwell and the pressure caps.

Figure 8 is a section on line 8—8 of Figure 7.

Figure 9 is a view of the carriage which carries the distributing rollers and of said rollers.

Figure 10 is a view partly in side and partly in section of one of the distributing rollers and the supporting means.

Figure 11 is a section on the line 11—11 of Figure 10.

Figure 12 is a detail view showing another form of drive of the drum from the motor.

Figure 2:
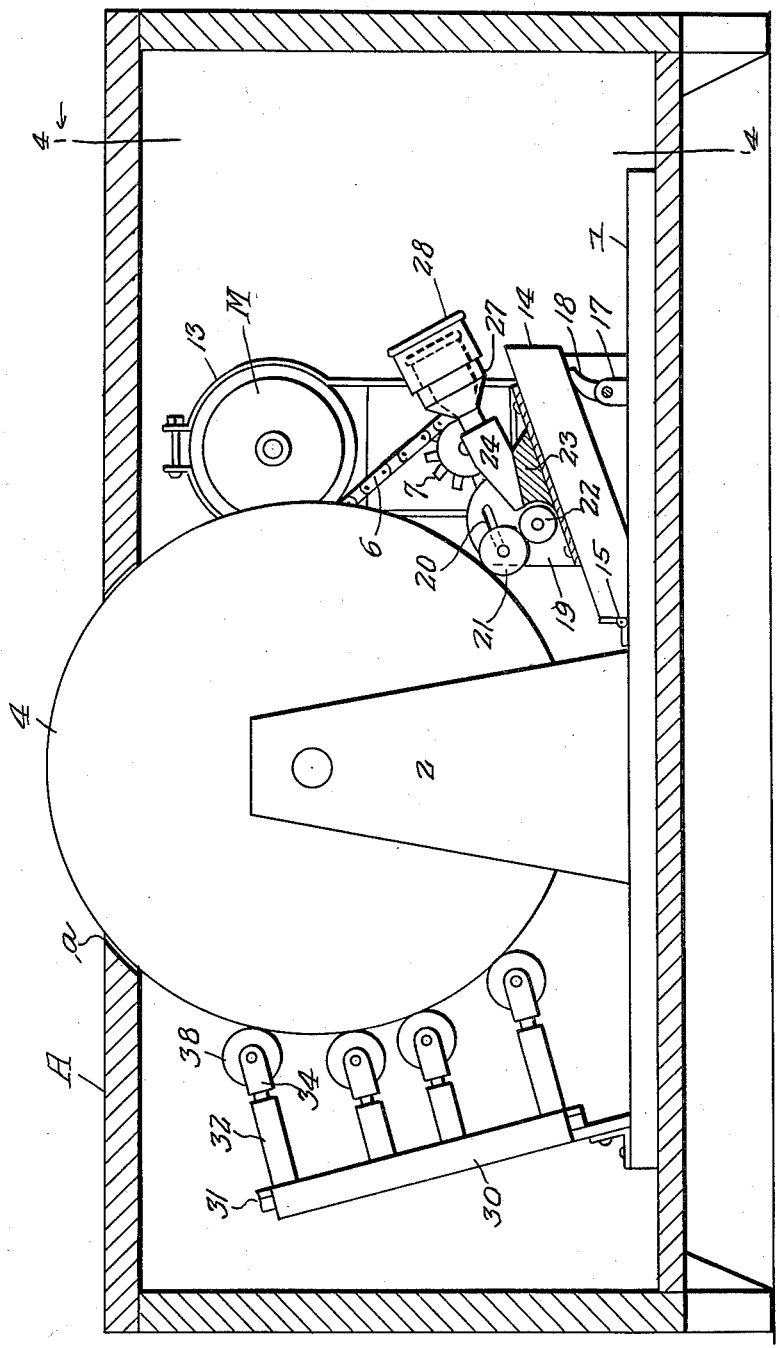
Figure 2 is a vertical longitudinal sectional view looking toward one side of the device.

In these drawings the numeral 1 indicates a base which has the uprights 2 thereon for the shaft 3 of a drum 4. A sprocket wheel 5 is attached to one end of the shaft 3 and a chain 6 passes over the sprocket and over a sprocket 7 on the shaft 8 of a reducing speed unit contained in a casing 9, the shaft 10 being driven from the motor M by the belt and pulleys shown generally at 11. The unit 9 and the motor M are supported by the base 12 and the clamping means 13. A hinged diagonally arranged base 14 is located in front of of the drum and is hinged to the base 1 as shown at 15 and a shaft 16 is journaled on the base 1 under the base 14 as shown at 17 and said shaft carries a cam member 18 so that by rocking the shaft 16 by means of the handle 16′, see Figure 1, the cam will raise or lower the base 14. A bracket 19 is fastened to the upper face of the base 14 and its upturned ends have diagonal arranged slots 20 therein for receiving the pintles of a rubber roller 21 and the bracket also rotatably supports a grooved roller 22 of metal or the like which contacts the lower part of the roller 21. A stand 23 is carried by the bracket 19 adjacent the roller 22 and an inkwell 24 is attached to the stand and has its tapered end discharging against the roller 22. This well is formed into two chambers by a partition 25 which tapers from the outer end wall of the inkwell to the open end thereof as shown in Figure 7. A small ink container 26 is connected to the outer wall of the well and communicates with one chamber and a large container 27 is also connected with the outer wall of the well and communicates with the other chamber and each container has a cap 28 threaded thereto so that by threading the cap inwardly the ink will be discharged from the cup into the chambers of the well and from the well the ink will flow onto the roller 22 which distributes the ink upon the rubber roller 21 and when this roller 21 is in engagement with the circumference of the drum 4 the ink will be placed on said circumference. The ink is placed on the circumference of the drum 4 when the base 14 is in raised position as shown in Figure 2 but by lowering the cam 18 by rocking the shaft 16 the base will be lowered so that the roller 21 will not contact with the drum.

A diagonally arranged track forming member 30 extends upwardly from the base 1 and is located at that side of the drum opposite the side at which the inking means are arranged and a carriage 31 is carried by the track member 30. A plurality of cylinders 32 extend toward the drum from the carriage 31 and these cylinders are arranged in a diagonal row as shown in Figure 9 with the end cylinders longer than the intermediate cylinders. A forked plunger 34 is slidably arranged in each cylinder and is limited as to its sliding movement by a pin 35 carried by the plunger entering a slot 36 in the cylinder. A spring 37 in each cylinder tends to project each plunger toward the drum and a roller 38 is rotatably arranged in each forked part as shown. These rollers 38 tend to distribute the ink applied to the circumference of the drum evenly on the circumference.

Instead of using a chain drive on the drum I may use the worm drive shown in Figure 12 which includes a worm 40 on the shaft 41 of the motor M, the worm meshing with a worm gear 42 on a worm shaft 43, the worm 44 of which meshes with a gear 45 on a worm shaft 46. The worm 47 of the shaft 46 meshes with a worm gear 48 on the shaft 3' of the drum 4'.

The base 1 and the parts carried thereby are preferably placed in a casing A, the bottom of which supports the base 1 and the top of the casing having an opening a therein thru which a portion of the drum projects and the casing also has a slot a' therein through which passes shaft 16 so that the handle 16' of the shaft is readily accessible from outside of the casing.

It has been found that that part of the drum adjacent the motor is used infrequently and for this reason the inkwell is provided into the two chambers with the small cup attached to that chamber which supplies ink to that part of the drum nearest the motor, the large cup supplying ink to the chamber which supplies ink to the most used part of the ink surface of the drum. Thus arrangement of the inkwell and large and small cups shown in Figures 7 and 8 eliminates an over abundance of ink where it is not wanted.

When the device is to be used the motor is started, and the motor operates the drum approximately one revolution per minute. After the machine is started the two ink caps 48 are turned slightly to force ink from the cups into the chambers of the well and the ink will pass from these chambers upon the metal feed roll 22 which distributes the ink by means of a spiral groove onto the rubber inking roller 21 which is bodily movable in the frame 19 through its pintles being slidable in the slots 20. Then the adjusting shaft 16 is turned to the right or left a quarter turn to bring the rubber inking roller 21 into contact with the circumference of the drum 4, this being accomplished by the cam 18 pushing upwardly the base 14 so that the roller 21 will engage the circumference of the drum. As the drum revolves the ink is transmitted from the inking roller 21 onto the circumference of the drum and as the inked surface reaches the four staggered rollers 38 said rollers evenly distribute the ink across the entire area of the circumference of the drum. The base 14 is then lowered by turning the shaft 16 so that the roller 21 is moved out of contact with the drum and this can be done after the drum has made two complete revolutions. This of course, depends on the ink used and the temperature of the room where the machine is operated.

All the rollers are made removable so that they can be cleaned.

It will of course be understood that the person having his fingerprints made applies his finger tips to the exposed part of the circumference of the drum 4 and then places the tips on a card or the like. The drum is constantly rotated to provide a freshly inked surface always ready for the operative use without the least stopping at the completion of each fingerprint card to reink the inked surface as one inking will take care of between twenty and thirty cards, depending on the condition of the fingers being printed.

The invention eliminates the use of the glass slab now in use and its disadvantages so that fingerprints can be produced much quicker with the invention than under the old method and both time and labor are saved by this machine. The machine also has the added advantage of cleanliness in so far as the operators are concerned and it only has to be cleaned at the end of each days work and where fingerprinting is done both day and night the machine would not have to be cleaned oftener than once every twenty-four hours. The ink is distributed uniformly, thus creating a better and more legible print and resulting in the saving of ink.

To clean the device it is simply necessary to remove the rollers from their holders and then start the motor while the drum revolves a cloth soaked in gasoline or the like is held at the top of the drum to remove the ink and then a dry clean cloth is placed on the circumference of the drum to dry the same. As the rollers are removed they can be dropped in a bowl of gasoline or the like and then removed and wiped off and replaced.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. An inking device for use in fingerprinting comprising a rotatably supported drum, means for rotating the drum, means located at one side of the drum and including a roller for applying ink to the circumference of the drum, means for moving the roller away from and against the circumference of the drum, spring-pressed rollers located at the opposite side of the drum for distributing the ink applied to the circumference of the drum uniformly over the entire area of the circumference, and a casing enclosing the parts and having a flat top provided with an opening through which a portion of the drum extends whereby the fingers of a person can be placed against said portion to have ink supplied to the fingers.

2. An inking device of the class described comprising a base, uprights carried by the base, a drum rotatably supported between the uprights, a motor for rotating the drum, a second base hingedly connected to the first base located adjacent a lower part of the drum, a frame carried by the second-base, a roller bodily movable in the frame for contacting the periphery of the drum, a second roller rotatably arranged in the frame for contacting the underpart of the first roller, an inkwell supported by the frame and discharging ink upon the second roller, a supply cup in communication with the well, a cap threaded to the cup for forcing ink therefrom into the well, manually operated means for swinging the second base to place the first roller against the circumference of the drum or to move it away from said circumference and distributing rollers engaging the circumference of the drum and arranged opposite the inking rollers.

3. In an inking device of the class described, a drum, means for rotating the drum, an inkwell divided into two chambers, rollers for taking the ink from the well to the circumference of the drum, and ink cups in communication with each chamber, one cup being larger than the other, a cap threaded on each cup for forcing ink from a cup into the chamber with which the cup communicates, a supporting member for the two rollers and the well, manually operating means for adjusting the supporting member toward and away from the roller to move the upper roller to contact with the drum or out of contact with the drum.

4. In an inking device of the class described, a drum, means for rotating the drum, an inkwell divided into two chambers, rollers for taking the ink from the well to the circumference of the drum, and ink cups in communication with each chamber, one cup being larger than the other, a cap threaded on each cup for forcing ink from a cup into the chamber with which the cup communicates, a supporting member for the two rollers and the well, manually operating means for adjusting the supporting member toward and away from the roller to move the upper roller to contact with the drum or out of contact with the drum, a diagonally arranged track forming member attached to the base at that side of the drum which is opposite the side on which the inking means are located, a diagonal row of cylinders, a carriage to which the cylinders are connected which is slidably arranged to the track member, spring plungers in the cylinders and a roller at the other end of each plunger for engaging the periphery of the drum, said rollers distributing the ink over the entire area of the circumference.

EDWARD J. HOLLISTER.